June 13, 1944. H. GAMACHE 2,351,327
PEELING IMPLEMENT
Filed Oct. 28, 1943
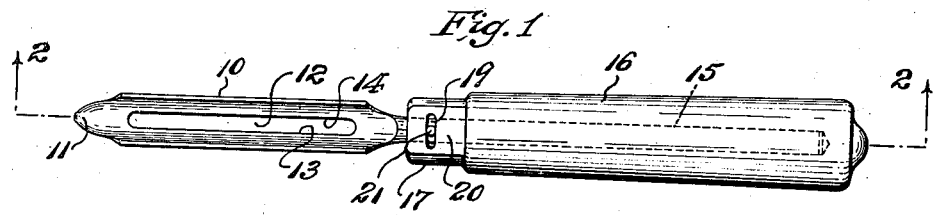
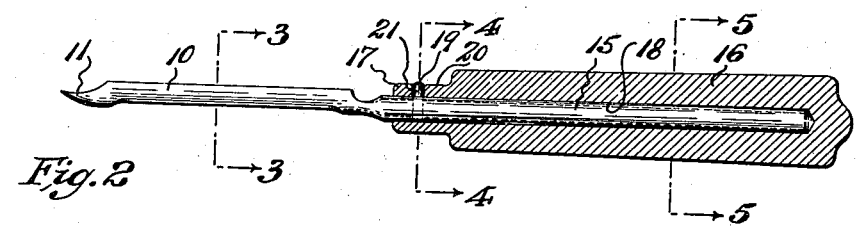
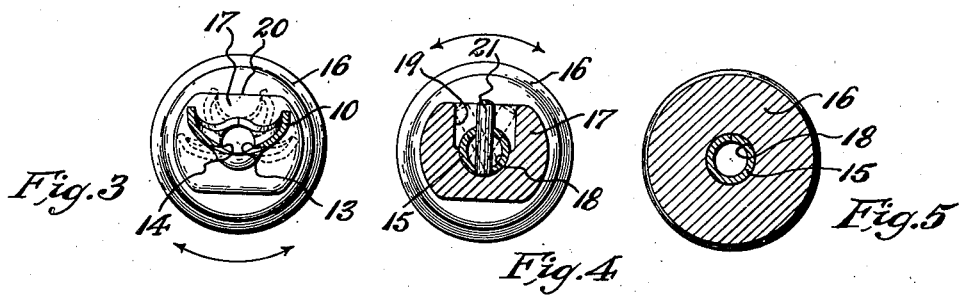
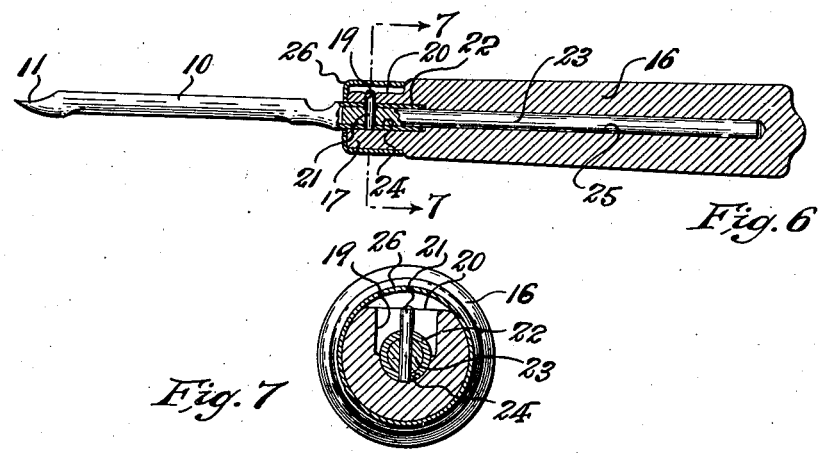
INVENTOR.
Homer Gamache,
BY
ATTORNEY.

Patented June 13, 1944

2,351,327

UNITED STATES PATENT OFFICE 2,351,327

PEELING IMPLEMENT

Homer Gamache, Newark, N. J., assignor to Acme Metal Goods Manufacturing Co., Newark, N. J.

Application October 28, 1943, Serial No. 507,995

4 Claims. (Cl. 30—278)

This invention relates to an improved implement for peeling vegetables, fruits or the like; and the invention has reference, more particularly, to a peeling implement having an edged blade supported by a handle in axial extension therefrom, and capable of oscillatory rocking movement about the longitudinal axis of the handle whereby, in use, a cutting edge of the blade will be caused to readily follow irregular contours of the vegetable or the like operated upon, so as to produce a paring or peel of substantially uniform thickness without gouging the vegetable body, and consequently with a minimum waste of said body.

The invention has for its general object to provide a novel peeling implement of the kind mentioned which is simple in structure, comprising but a minimum number of parts; which can be manufactured economically at a minimum of labor and material cost; and which, in use, is sturdy, durable and easy to manipulate.

The invention has for a further object to provide a novel peeling implement of the kind mentioned which comprises a handle member of rigid solid material having an axial bore extending substantially throughout the length thereof, a blade having an axial journal extension entered in said handle member bore so as to turn therein, and cooperative pin and slot coupling means between said blade journal extension and the handle member, whereby to both retain the blade and handle member in assembled relation, and at the same time permit but limit the free oscillatory rocking movement of the blade relative to the handle member and about the longitudinal axis thereof.

Other objects of this invention, not at this time more particularly enumerated, will be understood from the following detailed description of the same.

Illustrative embodiments of this invention are shown in the accompanying drawing, in which:

Fig. 1 is a plan view of one form of the peeling implement according to this invention; Fig. 2 is a longitudinal sectional view thereof, taken on line 2—2 in Fig. 1, the blade being shown in elevation; Figs. 3, 4 and 5 are respectively transverse sectional views, taken respectively on lines 3—3, 4—4, and 5—5 in Fig. 2, but drawn on an enlarged scale.

Fig. 6 is a view similar to that of Fig. 2, but showing a modified form of the peeling implement of this invention; and Fig. 7 is a transverse sectional view, taken on line 7—7 in Fig. 6, but drawn on an enlarged scale.

Similar characters of reference are employed in the above-described views, to indicate corresponding parts.

The embodiment of the invention shown in Figs. 1 to 5 inclusive is provided with a blade or cutter member 10 which is made of sheet metal, the same comprising an elongated body of concavo-convex cross-sectional shape, which terminates at its forward free end in a suitably shaped and pointed extremity 11, adapted for use as a gouge or corer for removing undesired parts from the vegetable or other body to be peeled. The blade or cutter body 10 is provided with a longitudinally extending, centrally disposed slot 12, the side margins of which define oppositely directed and suitably sharpened cutting edges 13 and 14. Said cutting edges being spaced apart and oppositely directed are so related that the one not in use cooperates with the one in use as a guide or guard adapted to limit the cutting penetration or depth of cut made by the latter. At its rearward end, the material of the blade or cutter body is wrought into a substantially axially disposed rearwardly extending tubular journal extension 15.

The reference character 16 indicates the handle member of the implement. Said handle member is made of rigid solid material, such e. g. as plastic material, wood, bone or the like, and may be of any desired shape or design. At its inner end, said handle member preferably terminates in a neck portion 17 of reduced diameter. Extending axially into the handle member from its inner extremity is a longitudinal bore 18 corresponding in diameter to the external diameter of the journal extension 15 of the blade or cutter body 10. Said bore 18 extends substantially throughout the length of the handle member, but preferably terminates adjacent to the outer end of the latter, so as to provide said bore with a closed rearward end.

The journal extension 15 of the blade is entered in the bore 18 of the handle member 16 so as to be capable of turning in the latter, thus providing a long journaling support of the blade or cutter member 10 substantially throughout the length of said handle member, so that the blade member or body 10, although free for oscillatory turning movement about the axis of the handle member, is nevertheless held firmly against lateral play or wobbling relative to the latter.

Means is provided to both retain the blade member or body 10 and the handle member 16 in the described assembled relation as well as to limit the oscillatory rocking movement of the former about the axis of the latter. This means comprises a transverse slot 19 of suitably predetermined length and width, which is formed in the neck portion 17 of the handle member to enter downwardly therethrough from one side thereof so as to intersect the bore 18 of said handle member. Preferably at least that side of the neck portion 17 from which said slot 19 extends is cutaway to provide a flattened external face 20. Passed downwardly or inwardly through said slot 19 to extend diametrically across and through the journal extension 15 of the blade or cutter body, to which it is rigidly affixed is a stop pin 21. Said stop pin 21 oscillates with the blade or cutter body and its journal extension, the amplitude of such oscillatory movement being limited by abutment of the free or exterior end of the stop pin 21 with the ends of the slot 19 (see Fig. 4). It will thus be understood that said cooperating slot and stop pin connection between the journal extension of the blade or cutter body and the handle member not only couples the blade or cutter body to the handle member against longitudinal displacement, but also serves as means for limiting the oscillatory movement of the blade or cutter body relative to the handle member when the implement is in use.

In Figs. 6 and 7 is shown a modified embodiment of the peeling implement according to this invention, the same having a blade or cutter body 10 similar to that previously above described, but instead of providing the same with the long journal extension 15, it is provided with a relatively short tubular shank portion 22, into which is telescopically fitted a rearwardly extending journal extension 23 of rod form. The thus modified blade or cutter structure is mounted in a handle member 16 having the neck portion 17 and coupling slot 19, but being provided with a modified form of axial bore comprising a blade shank journaling section 24 and a journaling bore 25 of reduced diameter extending rearwardly therefrom through the handle material, said journaling bore 25 being sized to fit and receive the journal extension rod 23. This modified arrangement permits the use of cheaper material for the journal extension of the blade or cutter element; i. e. instead of high quality steel from which it is desirable to form the blade or cutter body per se, and therefor from which the integral journal extension 15 of the first described construction is also made, a cheaper and even softer metal may be employed for the journal extension rod 23. In said modified construction the stop pin 21 is provided so as to pass downwardly or inwardly through the slot 19 to extend diametrically through the blade shank portion 22 and contained journal extension rod 23 so as to be rigidly affixed to these parts, and thereby so as to secure the same in mutually affixed assembled relation. As in the first described construction, this stop pin 21 oscillates with the blade and limits the amplitude of such oscillation by abutment upon the ends of the slot 19, while at the same time the pin serves to couple the blade and handle against separation from their operative assembled relation.

In Figs. 6 and 7 the implement is shown to be provided with a ferrule 26 engaged over and fixed upon the handle neck portion 17, whereby to enclose the stop pin and slot connection so as to guard the same against obstruction by dirt or other foreign material otherwise likely to gain access to the interior of the slot 19. While such ferrule 26 is not shown applied to the first described construction of the peeling implement, it will be understood that such ferrule may be applied thereto with the same advantage.

It will be understood that, in the use of the implement, when peeling a vegetable or the like therewith, the pivotal oscillation of the blade or cutter body will allow the applied cutting edge thereof to follow the contour of the vegetable or the like, so as to pare therefrom a peel without undue waste; the severed peel clearing itself through the slot 12 bordered by the cutting edge in use. The implement may be moved in opposite directions, or may be used and applied by either the right or left hand of the operator, the cutting edges 13 and 14 being accordingly selectively usable.

Having now described my invention, I claim:

1. A peeling implement comprising a handle member of rigid solid material having an axial bore extending thereinto from its inner end, a blade having a journal extension projecting from its rear end, said journal extension being journaled in the handle member bore to mount said blade for oscillatory movement about the axis of the handle member, said handle member having a transverse slot entering through a side thereof so as to intersect the bore thereof, and a stop pin affixed to the journal extension of said blade to project radially therefrom into said slot, whereby to both retain the blade coupled to the handle member and to limit oscillatory movement of the blade by impingement of the free end portion of said stop pin on the slot ends.

2. A peeling implement comprising a handle member of rigid solid material having an axial bore extending thereinto from its inner end, a blade having a journal extension projecting from its rear end, said journal extension being journaled in the handle member bore to mount said blade for oscillatory movement about the axis of the handle member, said handle member having a transverse slot entering through a side thereof so as to intersect the bore thereof, a stop pin affixed to the journal extension of said blade to project radially therefrom into said slot, whereby to both retain the blade coupled to the handle member and to limit oscillatory movement of the blade by impingement of the free end portion of said stop pin on the slot ends, and means to cover the slotted portion of said handle member.

3. A peeling implement comprising a handle member of rigid solid material having an axial bore extending thereinto from its inner end substantially throughout the length thereof, a blade having a journal extension projecting from its rear end, said journal extension approximating in length the length of said handle member bore and being journaled in the latter to mount the blade for oscillatory movement about the axis of the handle member, said handle member having a neck-portion of reduced diameter at its inner end, said neck-portion having a transverse slot entering through a side thereof so as to intersect the handle member bore, and a stop pin affixed to the journal extension of said blade to project radially therefrom into said slot, whereby to both retain the blade coupled to the handle member and to limit oscillatory movement of the blade by impingement of the free end portion of said stop pin on the slot ends.

4. A peeling implement comprising a handle member of rigid solid material having an axial bore extending thereinto from its inner end substantially throughout the length thereof, a blade having a journal extension projecting from its rear end, said journal extension approximating in length the length of said handle member bore and being journaled in the latter to mount the blade for oscillatory movement about the axis of the handle member, said handle member having a neck-portion of reduced diameter at its inner end, said neck-portion having a transverse slot entering through a side thereof so as to intersect the handle member bore, a stop pin affixed to the journal extension of said blade to project radially therefrom into said slot, whereby to both retain the blade coupled to the handle member and to limit oscillatory movement of the blade by impingement of the free end portion of said stop pin on the slot ends, and a ferrule mounted on said neck-portion so as to close the outer opening of said slot.

HOMER GAMACHE.